(12) United States Patent
Vatanen

(10) Patent No.: US 7,010,694 B2
(45) Date of Patent: Mar. 7, 2006

(54) METHOD AND SYSTEM FOR APPLICATION OF A SAFETY MARKING

(76) Inventor: Harri Vatanen, 2 Rushmore Place, Englefield Green, Surrey (GB) TW20 0NN ( * ) Notice: Subject to any disclaimer, the term of this patent is extended or adjusted under 35 U.S.C. 154(b) by 683 days.

(21) Appl. No.: 09/835,668

(22) Filed: Apr. 16, 2001

(65) Prior Publication Data

US 2002/0083320 A1 Jun. 27, 2002

Related U.S. Application Data

(63) Continuation of application No. PCT/FI99/00851, filed on Oct. 14, 1999.

(30) Foreign Application Priority Data

Oct. 14, 1998 (FI) ...................................... 982232

(51) Int. Cl.
*H04L 9/00* (2006.01)

(52) U.S. Cl. ...................... 713/176; 713/182; 713/186
(58) Field of Classification Search ................ 713/176, 713/182, 184–186, 194, 200–201; 380/54, 380/247, 270, 200–203; 705/57–59; 382/100, 382/115–118, 124, 129
See application file for complete search history.

(56) References Cited

U.S. PATENT DOCUMENTS

| 5,742,685 A | 4/1998 | Berson et al. |
| 5,760,386 A | 6/1998 | Ward |
| 5,787,186 A | 7/1998 | Schroeder |
| 5,956,409 A | 9/1999 | Chan et al. |
| 5,974,141 A * | 10/1999 | Saito ........................... 705/52 |
| 5,984,366 A | 11/1999 | Priddy |
| 6,084,968 A * | 7/2000 | Kennedy et al. ............. 380/259 |
| 6,141,753 A * | 10/2000 | Zhao et al. .................. 713/176 |
| 6,754,822 B1 * | 6/2004 | Zhao ........................... 713/176 |

FOREIGN PATENT DOCUMENTS

| WO | WO 94/19770 | 9/1994 |
| WO | WO 97/15032 | 4/1997 |
| WO | WO 98/32093 | 7/1998 |
| WO | WO 98/38567 | 9/1998 |

* cited by examiner

*Primary Examiner*—Hosuk Song
(74) *Attorney, Agent, or Firm*—Cohen, Pontani, Lieberman & Pavane

(57) ABSTRACT

A method and system for the identification of an article marking device is based on the encryption of information and a biometric sample of the person to be identified, thus providing a marking device for effectively and reliably confirming the identity of an individual claiming ownership of the marking device or marked article. In practice, double verification of the authenticity of a claimed owner of the marking device is achieved. The first verification requires that the claimed owner know a private password for a key that has been used to encrypt the information stored in the marking device, and the second verification requires a match between a biometric sample taken from the claimed owner and a biometric sample code that is stored in the marking device or with information derived from the stored information.

24 Claims, 2 Drawing Sheets

METHOD AND SYSTEM FOR APPLICATION OF A SAFETY MARKING

The is a continuation of PCT Application No. PCT/FI99/00851, filed on Oct. 14, 1999, which claims priority from Finland Application No. FI982232, filed Oct. 14, 1998.

BACKGROUND OF THE INVENTION

1. Field of the Invention

The present invention relates to electronic safety markings. In particular, the invention is directed to a new and improved method and system for the application of a safety marking in an electric or electronic form for the marking of objects and devices.

2. Description of the Related Art

Safety marking is conventionally employed for the marking of objects, devices and information in order to protect them against theft and misuse. Such safety markings may consist of the owner's social security number or name, or another piece or item of identifying information, that is engraved on or otherwise physically (and often nonremovably) affixed to an article to identify the owner of the article. However, this type of marking is difficult and/or impractical to implement since an engraving or corresponding physical marking procedure may damage the device to be marked and the resulting marking often has a noticeably unaesthetic effect on the appearance of the article.

A safety marking may also be based on biometric data, such for example as the DNA, fingerprint, or data obtained from the eye, in which case the person's identity can be more reliably ascertained. On the other hand, cloned individuals have identical DNA but different fingerprints. The accuracy of identification can therefore be further improved by combining different, independent identifying factors. The DNA of a human being can be formed in $2^{44}$ (i.e. about $1.76 \times 10^{13}$) different ways, and the number of inhabitants on the earth is on the order of about $10^{10}$. Accordingly, by combining the individual's DNA with his or her independent fingerprint data and, by way of example, the PIN code used in the individual's mobile communication device, the number of different, unique combinations is increased to about $10^{29}$.

At present, objects can also be marked with an electric or electronic safety marking, based on the idea of marking objects with a small coded safety chip which contains marking data that can only be read using special reading apparatus. A system of this nature is based on transponder technology that is used in conjunction with almost invisible chips. The chips are generally passive and therefore cannot be re-programmed, as a consequence of which they cannot be forged and are relatively insensitive to electromagnetic radiation. To apply such an electronic safety marking to an article or object, the customer purchases the safety marking from an authorized dealer, who installs the microchip in the object to be marked. The safety marking is additionally registered, using a register card, in a database that is maintained by a trusted third party.

When a stolen object that has been provided with such a safety marking is found, the information contained in the chip is read using a special reading apparatus. The so-determined information is then compared with the data stored in the third party database to identify the correct or rightful owner of the object. Such an arrangement, however, requires that a special registration database be maintained and consulted and is therefore difficult to implement and use. Moreover, the reading apparatus or the information read thereby is subject to modification or manipulation prior to the database query or comparison. As a consequence, that prior art system cannot be fully relied upon.

SUMMARY OF THE INVENTION

It is accordingly the desideratum of the present invention to eliminate, or at least significantly minimize, the problems, drawbacks and deficiencies of the prior art as, for example, hereinabove discussed and described.

It is a particular object of the invention to provide a new type of method and system for electronic marking of articles, objects, devices or information which simplifies the identification of marked equipment and achieves a system of absolute reliability.

The present invention thus provides, inter alia, a method for the application of a safety marking to an article or object or device, in which the device to be marked is provided with a safety marking in an electric or electronic form. The marking can be installed in the device or object so unnoticeably and inconspicuously that it is practically impossible to locate or discover.

In accordance with the invention, the applied safety marking is read by and into an identification device and is decoded in order to obtain the information contained in the marking. This information may include personal owner identification data, such as the owner's name, social security number, etc. It is also within the intended scope and contemplation of the invention that, for example, a PIN (Personal Identity Number) code, which enables formation of an electronic signature, be required to access the stored data or as a part of the stored data. Where the article to be marked is a mobile telecommunication device or station such as a user's mobile telephone, the PIN code may be implemented either in the mobile station itself or in the associated SIM (Subscriber Identification Module) card. The PIN code and its length can be defined to fit the particular application and, in some contemplated embodiments, can be implemented so that the user can selectively change the PIN code.

In one embodiment of the invention, the safety marking is produced by forming a first string of a predetermined form using personal or other identification data. The predetermined form may, by way of example, be of binary form, thereby enabling its ready handling by a microprocessor. The first string is encrypted using a first key, thus encrypting information concerning what personal data has been used to form the safety marking, and the string is electrically signed. The encrypted first string is then further encrypted in a marking device, for example using the user's public key, to generate an encrypted string. The marking device preferably contains two encryption keys.

The user's public key in the marking device is not known to the outside world, i.e to those without authorized access to the operations of the marking device. The identification data accordingly remains concealed from the public, thus affording privacy protection to the user of the safety marking. The encrypted string is stored in an electric or electronic form in the marking device, which is attached to or forms a part of the object or product to be marked.

To decrypt the safety marking, the encrypted string is read into an identification device that incorporates a means for reading and decrypting the encrypted string. The identification device also contains a decryption key to which only the owner and user of the safety marking has the right of access. In practice, the access right is implemented by a password for the decryption key, as for example a PIN code or other like code of the user, that is required for using the decryption key to decrypt the safety marking string. The user may also transfer or transmit or otherwise provide this decryption key, in an encrypted form, to a trusted repository or reliable third party, as for example the police, to enable such a trusted third party to decrypt the key and use it for reading the safety marking and determining the identity of the owner of the marked article or object.

The personal data used to form the string may, in preferred implementations of the invention, comprise a biometric sample of the owner of the safety marking. The biometric sample may be the user's DNA code which is stored in the safety marking in a predetermined form, and may additionally comprise a fingerprint or a photograph or image of the retina or iris of the user's eye. Using these data samples, a graphic representation is generated and encoded into a suitable form, as for example binary form, for encryption using any known or otherwise suitable encryption method.

Inclusion of a biometric sample in the personal data from which the string is formed provides a double safety check for verifying the owner of the safety marking. When a user claiming to be the owner of a safety marking provides a password with which the safety marking can be decrypted and the user's personal details are so obtained, a first check has thereby been carried out since the password for the decryption key is specific to the person or user. The person claiming to be the owner can then be further associated with the safety marking by taking from that person a biometric sample of the type used to form the safety marking. Where that biometric data is DNA data, a resulting match between the DNA taken from the person claiming to be the owner and the DNA code contained in the safety marking provides a second check and, indeed, irrefutable evidence that the safety marking belongs to the person claiming ownership of the safety marking and/or article.

Also included in the safety marking are personal details of the owner to thereby individualize the safety marking and for use in authenticating the owner.

The inventive system for application of a safety marking used for the marking of objects and equipment by providing such objects with a safety marking in an electric or electronic form comprises an identification device that includes a reading device for reading of an identification symbol and a processor for processing of the read identification symbol. The identification device may be implemented by any known apparatus or device constructed or configured or otherwise operable for reading a safety marking stored in an electric form. The properties and other structural and functional details of the identification device will primarily be determined as a function of the particular form of storage of the safety marking. Since the safety marking can be stored in many different forms, such for example as a graphic, bar code, binary, and other or equivalent forms, the reading device may likewise take on many different forms for reading the particular safety marking form and format as a general matter of design choice.

In accordance with the invention, the inventive system further comprises a means for generating a first string from personal data of the user in a predetermined form, and a means for encrypting the first string, using the user's public key, to form or define an encrypted string. The string generating means and the string encrypting means may, in one contemplated implementation of the invention, be located in a computer or like device to which the user's personal data is supplied and which is then used to form the safety marking. The inventive system further comprises a marking device for storing the encrypted string in an electric or electronic form. The encrypted string is fed to the marking device in a predetermined form. Finally, the inventive system additionally comprises means for decrypting the encrypted string using a decryption key provided in or by the identification device.

In a preferred embodiment, the marking device comprises a storage device and a first interface for linking the marking device with the reading device. The identification device may be implemented as a safety module which comprises a second interface for setting up a connection with the marking device. In a preferred form, the first and second interfaces are implemented using Bluetooth technology.

In contrast to prior art systems and methods, the present invention advantageously assures a safe and reliable arrangement for application of a safety marking in electric or electronic form to an article or object or device. The invention also significantly simplifies the use of a safety marking in an electric or electronic form because it does not require the use of a separate or remote registration database that must be queried to verify the identity of a claimed owner of the safety marking or so-marked article or object.

Yet a further advantage of the present invention, as compared with prior-art technology, is its accommodation of the ability to obtain double or twice-confirmed verification of the authenticity of the owner of the safety marking. The result is often complete certainty as to the identity of the claimed owner of the safety marking. The inventive procedure also affords privacy protection to the user of the safety marking since deciphering of the information contained in the safety marking is very difficult, in part as a function of the encryption algorithm that is employed.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters identify corresponding or similar elements throughout the several Figures.

DETAILED DESCRIPTION OF THE CURRENTLY PREFERRED EMBODIMENTS

Figure 1:
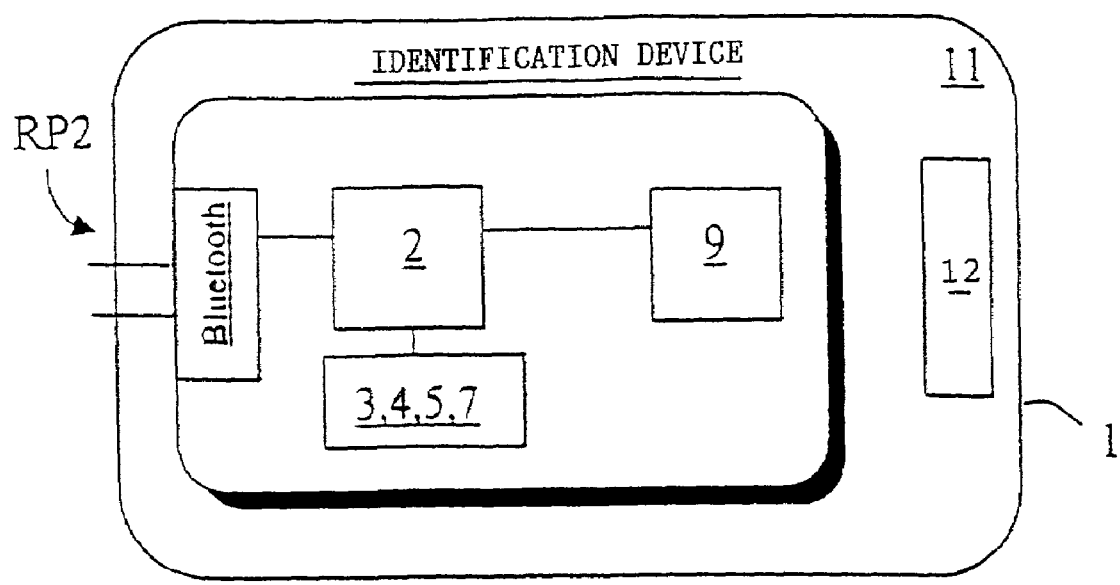
FIG. 1 diagrammatically depicts an identification device constructed in accordance with the present invention.
Figure 2:
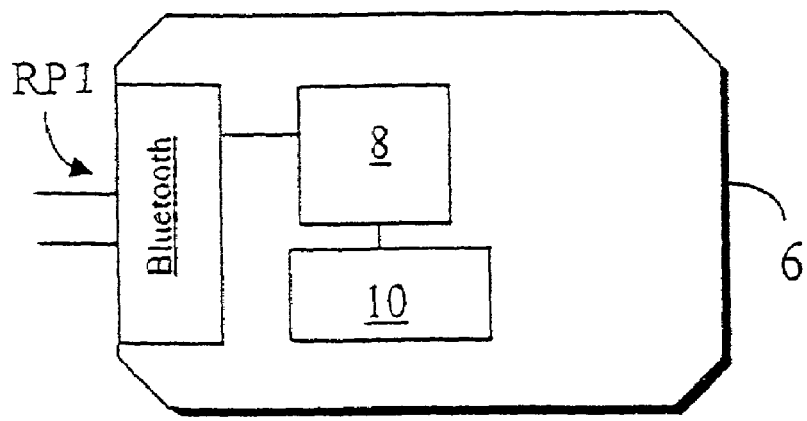
FIG. 2 diagrammatically depicts a preferred form of marking device in accordance with the invention.

A preferred implementation of an identification device 1 constructed in accordance with the present invention is shown in FIG. 1 and includes a second interface RP2 for linking the device 1 to a marking device 6 (FIG. 2). The identification device further comprises encryption and decryption means 5, 7 for encrypting the information to be stored in the marking device 6 and for decrypting the encrypted information read by means of the marking device.

The decryption means depicted in FIG. 1 comprises a processor 3, which may be specially designed and optimized for encryption functionality and which is operative for encrypting, decrypting and implementing an electric or electronic signature, and storage 9 which is connected to the processor for storing the keys and parameters needed by the decryption means. The information stored in storage 9 may include the personal decryption key of the user of the safety module, parameters for the encryption algorithm, and other necessary data. A preferred example of an encryption algorithm that may be used in implementing the present invention is the known RSA method, although other nonsymmetrical or symmetrical algorithms may alternatively be employed, dependent on the particular application or otherwise as a general matter of design choice.

The frame 11 of identification device 1 may, where for example the device 1 is intended for use in conjunction with a mobile telephone or station or like communication device, be designed to fit the size and contours and shape of the power source of the mobile station. In such an application, the frame 11 is provided with a connector 12 for connecting the identification device 1 to the mobile telephone. The connector 12 also serves to connect the power and communication lines between the identification device and mobile station. In this embodiment, the power source of the identification device should have a capacity substantially corresponding to at least that of the power source of the mobile station and may also be rechargeable. This arrangement permits the identification device 1 of the invention to be easily connected, both mechanically and electrically, to the mobile station by simply affixing it to the mobile station in place of the standard battery or power source that the mobile station would otherwise carry.

The marking device 6 that is shown in FIG. 2 includes a storage device 8 and a first interface RP1 for connecting the marking device to an external device, as for example an identification device 1. The marking device 6 may, in a preferred implementation of the invention but otherwise by way of example, comprise a commonly used and known marking device based on transponder technology.

The identification device 1, via the first and second interfaces RP1, RP2, can accordingly be connected to marking device 6 using a wireless or physical link to allow data transfer between the devices 1, 6. The encrypted string can be transferred to marking device 6 by means of the identification device 1 or in conjunction with the manufacture of the marking device 6. The encrypted string may be read by means of the identification device 1 or a corresponding or equivalent or like device that incorporates or is provided with the required reading means for the particular safety mark. Such a device may, by way of example, be implemented as a safety module such as that described in Finnish Patent Specification FI 981,902, the disclosure of which is incorporated by reference herein. It is also within the intended scope and contemplation of the invention that a so-called Bluetooth component may be provided, in conjunction with the interfaces RP1, RP2, to implement wireless data transfer functionality in accordance with the invention. The interfaces RP1, RP2 can be implemented using any optical infrared link, radio link or a known bus interface or technology.

Figure 3:
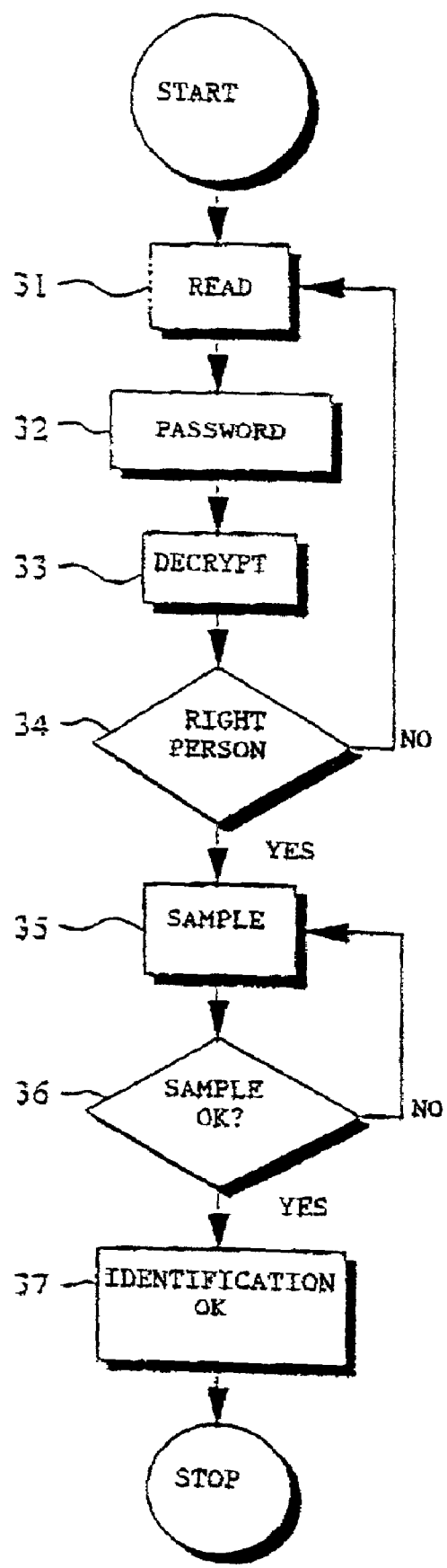
FIG. 3 is a flow chart of a preferred implementation of an identification method in accordance with the invention.

Shown in FIG. 3 is a flow chart of a preferred identification method in accordance with the invention. When an object or article that is provided with a safety marking, by way of a marking device 6, is to be identified, the information stored in the marking device 6 is read using the identification device 1 (block 31). This reading of the encrypted string stored in the marking device 6 may be effected via a wireless connection, or the identification device may be physically attached to, for electrical communication with, the marking device. After the information has been read into the identification device 1, the user's personal password is input to the identification device, thereby enabling use of the personal decryption key that is stored in the identification device (block 32). This procedure implements the first check for verifying the identity of the claimed owner of the marking device, since only the true owner of the marking device should be in possession of the decryption key that is needed to decrypt the encrypted string which is stored in the marking device 6.

Once the claimed owner of the marking device has provided the proper key, the encrypted string is decrypted by identification device 1 (block 33). The person's identity is then verified against the decrypted string thus obtained (block 34), for example by comparing the person's personal information with that which is stored in the string and, if it is thereby determined to correctly correspond to the identity declared by the person, then the method proceeds to block 35; if not, then the method returns to block 31 and the reading and decrypting operations can be repeated, for example three or otherwise multiple times, to assure that the lack of correspondence was not due to a simple and unintended user or technical error. At block 35, if a further check is to be carried out to verify that the person asserting ownership is actually the individual that he or she claims, a biometric sample is taken from the person and compared with the biometric sample information that is stored by the marking device. If the stored and new biometric samples agree, then the person's identity has been established with nearly absolute certainty and likewise that the marking device (i.e. the marked object or article) belongs to the person in question. This process of comparing the new and stored biometric samples can similarly be repeated, as for example three times, to make sure that a failure of the test has not been caused by a technical error or fault.

The invention thus enables local implementation of reliable personal identification without having to contact or establish a connection with a separate remote database to verify the correctness of a proffered identifier. As electronic identification becomes more common and widespread, situations using prior art systems in which several databases must be accessed and used to carry out identity checks are likely to arise with increasing frequency, situations which may well impair identity protection using prior art systems and methods.

In a typical contemplated case employing the present invention, described herein by way of nonlimiting example, a first string is formed from personal data about the user. The first string comprises the DNA code and fingerprint information of the user, both converted into digital form. The string thus formed is encrypted with the RSA 1024 method using the user's secret encryption key, as a result of which it will not then be possible to determine, from the encrypted string thereby generated, from what part or parts of the body the biometric data originated. The encrypted string is then electrically signed and encrypted using a public key, and the final identifier thus produced is incorporated in or into the product to be marked and thereby protected.

The resulting safety marking can be checked or read, as for example by means of an identification device attached to a mobile station, in which case the user's right to the marked object or information can be proven or demonstrated using the mobile station. Electronic information can be easily incorporated in the safety marking, such as in data stored in digital form. For instance, on a CD disk which contains a large amount of redundant information, it is possible to hide an identifier that is difficult to detect and is only found as the output of an appropriate function or predetermined operation. The safety marking embedded in the information cannot be altered since it is not visible from the outside. The safety marking can be read, as for example by a verification reading method, with the desired safety marking being obtained as an output for certain information. In this way, it is possible to verify data, such as copyright data, relating to or concerning or incorporating electronic information or, in other words, to mark electronic information in the name of a particular person, corporation or community.

Thus, while there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for identifying an owner of a safety marking that is used to mark an object to which the safety marking is attached in an electronic form, comprising the steps of:
   generating the safety marking by
      forming, from personal data representing personal information of the user, a first string in a predetermined form,
      encrypting the formed first string to define an encrypted first string,
      electronically signing the encrypted first string,
      encrypting the signed first siring to form a twice encrypted first string, and
      storing the twice encrypted string in an electric form in a marking device, the marking device being attached to or port of the object to be marked; and
   decoding the safety marking by
      reading the twice encrypted first string from the marking device on the object, by an identification device connected to a mobile station; and
      decrypting, by the identification device, the twice encrypted string using a decryption key provided in the identification device.

2. A method in accordance with claim 1, wherein the personal information comprises personal data comprising a biometric sample of the owner of the safety marking.

3. A method in accordance with claim 2, wherein the biometric sample comprises DNA code in a predetermined form of the owner of the safety marking.

4. A method in accordance with claim 2, wherein the biometric sample comprises a fingerprint specimen in a predetermined form of the owner of the safety marking.

5. A method in accordance with claim 2, wherein the biometric sample comprises an image, in a predetermined form, of an eye of the owner of the safety marking.

6. A method in accordance with claim 2, wherein the biometric sample is in binary form.

7. A method in accordance with claim 1, wherein the personal information is included in the safety marking to thereby individualize the safety marking.

8. A system for identification of a safety marking for marking an object by attaching the safety marking to the object in an electronic form, the system comprising:
   means for forming a first string in a predetermined form from personal data representing personal information of an owner of the safety marking;
   means for encrypting the formed first string to generate an encrypted first siring;
   means for electronically signing the encrypted first string;
   means for encrypted the signed encrypted first string to for a twice encrypted first string;
   means for storing the twice encrypted first string in an electric form in a marking device, the marking device being attached to or a part of the object to be marked; and
   an identification device connected to a mobile station, the identification device having a reading device for reading the twice encrypted first string and a processor for processing the read twice encrypted first string and decrypting the twice encrypted first string using a decryption key provided in the identification device.

9. A system in accordance with claim 8, wherein said marking device comprises a storage device and a first interface for connecting the marking device to the reading device.

10. A system in accordance with claim 8, wherein the identification device comprises a second interface for establishing a connection to said marking device.

11. A system in accordance with claim 8, wherein the personal information comprises personal data comprising a biometric sample of the owner of the safety marking.

12. A system in accordance with claim 11, wherein the biometric sample comprises DNA code in a predetermined form of the owner of the safety marking.

13. A system in accordance with claim 11, wherein the biometric sample comprises a fingerprint specimen in a predetermined form of the owner of the safety marking.

14. A system in accordance with claim 11, wherein the biometric sample comprises an image, in a predetermined form, of an eye of the owner of the safety marking.

15. A system in accordance with claim 11, wherein the biometric sample is in binary form.

16. A system in accordance with claim 8, wherein the personal information is included in the safety marking to individualize the safety marking.

17. An identification device connected to a mobile station for identifying a safety marking attached to one of an object or a device as an encrypted string in electronic form, the encrypted string being generated based on personal information of the owner of the object or device and the safety marking being used to mark the object or device, said identification device comprising:
   means for reading the encrypted string attached to the one of the object, device, or information from the safety marking into the identification device; and
   means for decrypting the encrypted string using a decryption key in the identification device for determining ownership of the object or device,
   wherein the mobile station further comprises:
   means for forming a first string in a predetermined form from personal data representing personal information of an owner of the safety marking;
   means for encrypting the formed first string to generate an encrypted first string;
   means for electronically signing the encrypted first string;
   means for encrypted the signed encrypted first string to for a twice encrypted first string;

means for storing the twice encrypted first string in an electric form as the safety marking in a marking device, the marking device being attached to or a part of the object or device to be marked.

18. An identification device connected to a mobile station in accordance with claim 17, wherein the personal information comprises personal data comprising a biometric sample of the owner of the safety marking.

19. An identification device connected to a mobile station in accordance with claim 17, wherein the biometric sample comprises DNA code in a predetermined form of the owner of the safety marking.

20. An identification device connected to a mobile station in accordance with claim 17, wherein the biometric sample comprises a fingerprint specimen in a predetermined form of the owner of the safety marking.

21. An identification device connected to a mobile station in accordance with claim 17, wherein the biometric sample comprises an image, in a predetermined form, of an eye of the owner of the safety marking.

22. An identification device connected to a mobile station in accordance with claim 17, wherein the biometric sample is in binary form.

23. An identification device connected to a mobile station in accordance with claim 17, wherein the personal information is included in the safety marking to individualize the safety marking.

24. An identification device connected to a mobile station in accordance with claim 17, wherein the identification device comprises a second interface for establishing a connection to said marking device.

* * * * *